United States Patent [19]

Baker et al.

[11] Patent Number: 4,717,280

[45] Date of Patent: Jan. 5, 1988

[54] RETAINING AND LOCKING CLAMP AND METHOD

[75] Inventors: George E. Baker, Healdsburg; Robert F. Schaefer, Sebastopol, both of Calif.

[73] Assignee: Hewlett-Packard Company, Palo Alto, Calif.

[21] Appl. No.: 841,912

[22] Filed: Mar. 20, 1986

[51] Int. Cl.⁴ ............................................. F16B 2/22
[52] U.S. Cl. .................................. 403/338; 403/336; 403/319; 292/204; 292/69
[58] Field of Search ............... 403/335, 336, 322, 323, 403/325, 338, 319; 292/202, 204, 67, 69

[56] References Cited

U.S. PATENT DOCUMENTS

| | | | |
|---|---|---|---|
| 1,765,671 | 6/1930 | Hiering | 292/204 |
| 1,943,927 | 1/1934 | Phillips | 292/204 X |
| 2,973,985 | 3/1961 | Siegal | 292/204 |
| 2,981,560 | 4/1961 | Wehner | 292/67 X |
| 3,337,245 | 8/1967 | Prunge | 403/361 |
| 3,951,444 | 4/1976 | Shull | 292/204 |

FOREIGN PATENT DOCUMENTS

| | | | |
|---|---|---|---|
| 143868 | 1/1954 | Sweden | 292/202 |
| 294948 | 7/1928 | United Kingdom | 292/202 |

Primary Examiner—Ricahrd J. Scanlan, Jr.
Assistant Examiner—Joseph A. Fischetti
Attorney, Agent, or Firm—Patrick J. Barrett; William C. Milks, III

[57] ABSTRACT

A retaining and locking clamp, mounted onto a first apparatus, for retaining and locking a second apparatus to the first apparatus. The first apparatus has a plate which in turn includes an aperture. The clamp comprises an inner rod that has a first end portion and a second end portion, the second end portion being adapted to be received within the aperture of the first apparatus plate so as to mount the inner rod to the first apparatus. The clamp also includes an outer sleeve that is rotatably mounted onto the inner rod, the outer sleeve has a retaining and locking flange and a surface. The clamp further comprises a turn knob that is rotatably mounted onto the inner rod, the turn knob has a surface that is adapted to frictionally engage the outer sleeve surface, whereby rotating the turn knob causes the turn knob surface to frictionally engage the outer sleeve surface so as to permit the outer sleeve flange to retain the second apparatus. The continued rotation of the turn knob after the rotation of the outer sleeve flange causes the outer sleeve flange to translate in an axial direction so as to firmly lock the second apparatus to the first apparatus.

24 Claims, 7 Drawing Figures

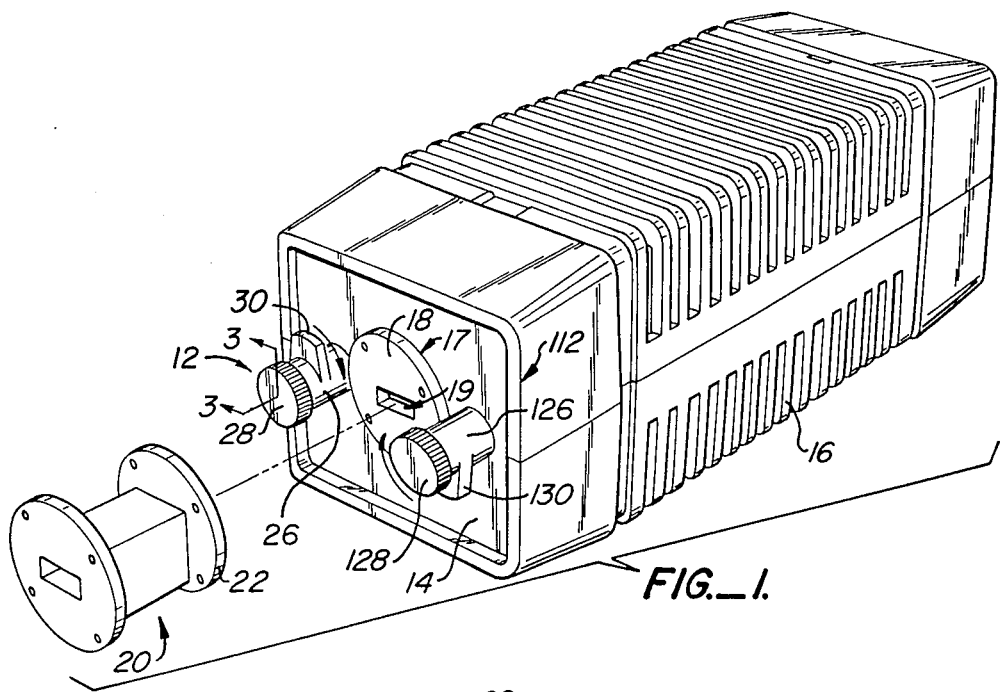
FIG._1.
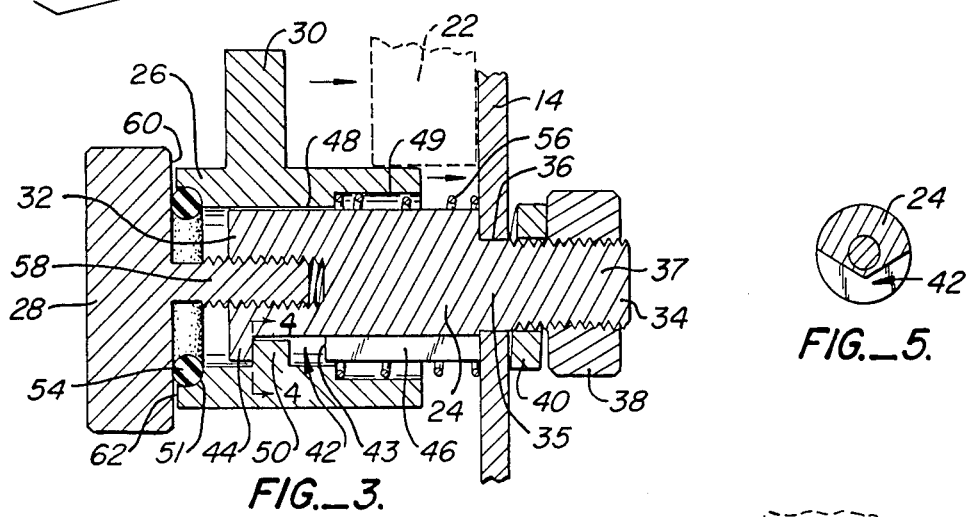
FIG._3.
FIG._5.
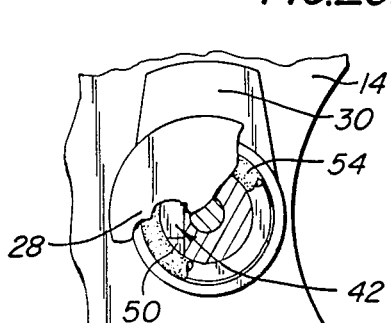
FIG._4A.
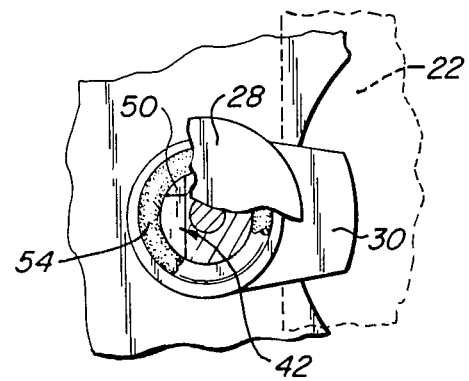
FIG._4B.

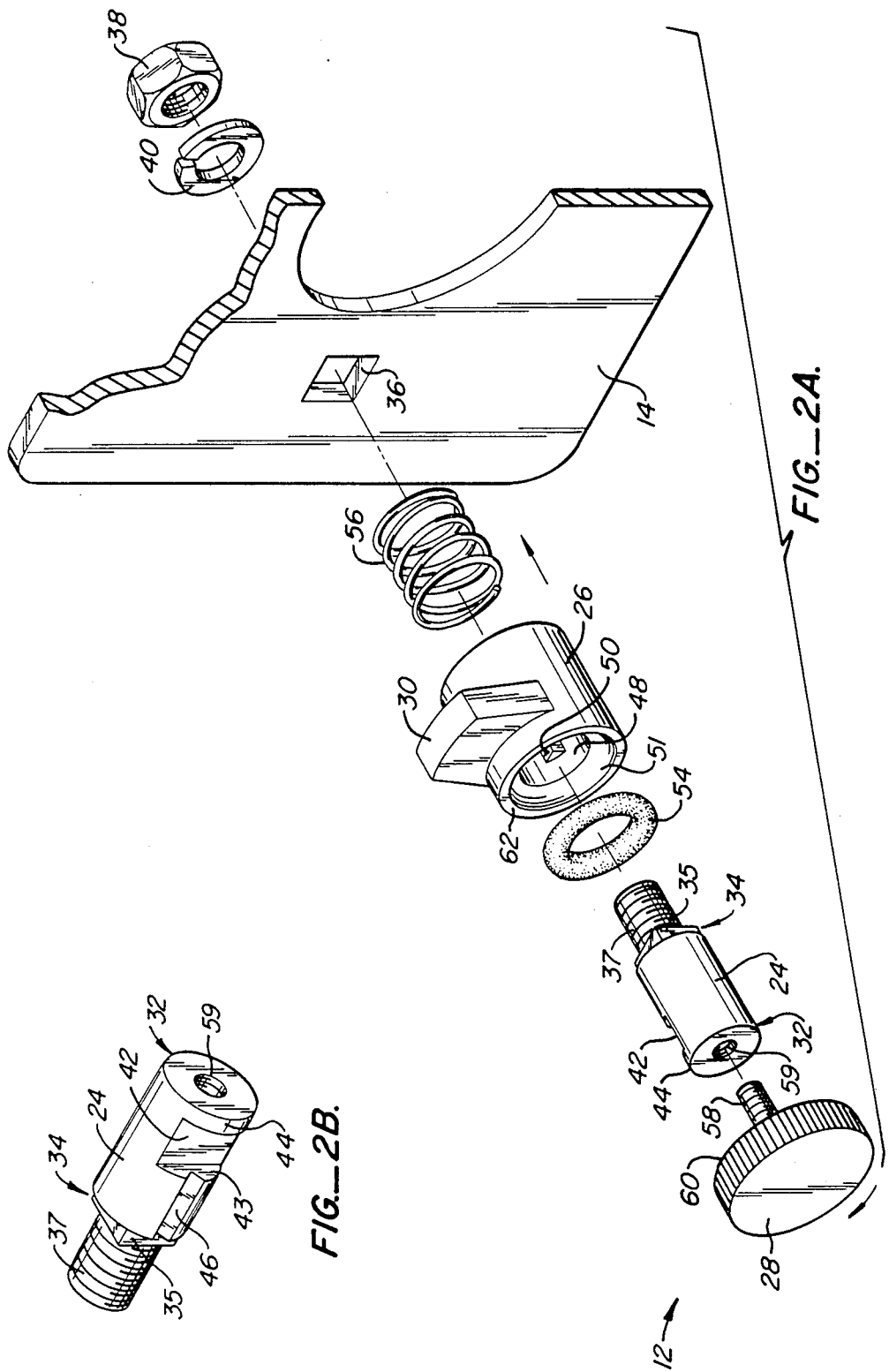

RETAINING AND LOCKING CLAMP AND METHOD

DESCRIPTION

1. Technical Field

This invention relates to clamping devices, and more particularly, to a retaining and locking clamp.

2. Background Art

Locking devices are common in the art. Locking devices for mating two apparatuses tend to be bulky or difficult to manipulate. For example, when two electrical apparatuses such as a waveguide and an analyzer are to be mated, the clamping devices for performing such mating tend to be cumbersome and difficult to manipulate. Two devices are generally used for this purpose—a first device for positioning the two apparatuses and then a second device for clamping or locking the two apparatuses. Since the apparatuses to be mated tend to be bulky, one or both of such apparatuses must be properly positioned and secured to a working surface before the user can lock the two apparatuses together. Moreover, other tools may have to be used to operate the locking mechanism. Further, more than one user may have to be present in order to position the apparatuses, secure the apparatuses, manipulate the locking or clamping mechanisms, and operate other tools. Thus, mating two apparatuses in the prior art, especially where the apparatuses are microwave equipments, is frequently a troublesome procedure.

An example of the locking devices in the prior art is a clamp that is mounted onto a Model 1406A Differential Amplifier manufactured by Hewlett-Packard Company of Palo Alto, Calif. A similar differential amplifier, Model 1400A, which is illustrated and described in Hewlett-Packard catalog No. 24 (April, 1963), also utilizes the clamp. In particular, differential amplifier 1406A is a subsystem of Hewlett-Packard's Model 140A Oscilloscope system. As such, the oscilloscope system includes a bracket frame for receiving the differential amplifier or other subsystems. When the differential amplifier is placed into the bracket frame, the clamp is used to secure the differential amplifier to the bracket frame.

More particularly, the differential amplifier clamp is mounted immediately adjacent to a side edge of the front panel of the amplifier. The clamp comprises a rod that passes through a mounting aperture of the front panel. A turn knob is mounted to the proximate or external end of the rod and a retaining and locking flange is rotatably mounted to the distal or internal end of the rod. The distal end of the rod has external threads and the flange includes internal threads. In addition, a L-shaped bracket is mounted adjacent to the retaining and locking flange. Moreover, a coil spring, which winds about the distal end of the rod, is provided to bias the flange away from the front panel.

In use, an operator, after the differential amplifier has been placed into the bracket frame, would rotate the turn knob, which is the only component of the clamp that is visible to the user. The operator's initial rotation causes the flange to rotate 90°, moving the flange from a vertical position to a horizontal position. The 90° rotation is limited by the L-shaped bracket. At the horizontal position, the flange is capturing the oscilloscope bracket frame between itself and the front panel of the amplifier. The bias provided by the coil spring ensures that a sufficient amount of clearance is available between the flange and the front panel so as to permit the capture of the bracket frame therebetween. As the operator continues to rotate the turn knob, the cooperative action of the threads, which are provided on both the distal end of the rod and the flange, causes the flange to move toward the front panel. The flange continues to be limited to the horizontal position by the L-shaped bracket. Eventually, the oscilloscope bracket frame is clamped between the flange and the front panel, fully securing the differential amplifier to the oscilloscope.

DISCLOSURE OF THE INVENTION

An ideal locking mechanism should be capable of positioning the two apparatuses to be mated with ease. In addition, the ideal locking mechanism should be capable of retaining the two apparatuses and then locking the two together with ease. Moreover, the entire locking procedure should be capable of being performed by a single user. In particular, the user should be capable of performing the locking procedure with only a single hand so as to permit the other hand to support one of the apparatuses.

It is a major object of the present invention to provide a retaining and locking clamp that is capable of positioning and then retaining two apparatuses with ease.

It is another object of the present invention to provide a retaining and locking clamp that is capable of locking the two apparatuses with ease.

It is a further object of the present invention to provide a retaining and locking clamp that is simple in design and easy to operate such that only a single user is needed to perform the retention and locking procedure.

In order to accomplish the above and still further objects, the present invention provides a retaining and locking clamp. The clamp, which is mounted onto a first apparatus, is adapted to retain and lock a second apparatus to the first apparatus. The first apparatus has a plate which in turn includes an aperture. The clamp comprises an inner rod that has a first end portion and a second end portion, the second end portion being adapted to be received within the aperture of the first apparatus plate so as to mount the inner rod to the first apparatus. The clamp also includes an outer sleeve that is rotatably mounted onto the inner rod, the outer sleeve has a retaining and locking flange and a surface. The clamp further comprises a turn knob that is rotatably mounted onto the inner rod, the turn knob has a surface that is adapted to frictionally engage the outer sleeve surface, whereby rotating the turn knob causes the turn knob surface to frictionally engage the outer sleeve surface so as to permit the outer sleeve flange to retain the second apparatus. The continued rotation of the turn knob after the rotation of the outer sleeve flange causes the outer sleeve flange to translate in an axial direction so as to firmly lock the second apparatus to the first apparatus.

Other objects, features, and advantages of the present invention will appear from the following detailed description of the best mode of a preferred embodiment, taken together with the accompanying drawings.

BRIEF DESCRIPTION OF THE DRAWINGS

FIG. 1 is a perspective view of a retaining and locking clamp of the present invention, mounted to an apparatus;

FIG. 2A is an exploded view of the retaining and locking clamp of FIG. 1, with portions broken away;

FIG. 2B is a perspective view of the inner rod of FIG. 2A, taken from a different angle;

FIG. 3 is a cross section view of the retaining and locking clamp of FIG. 1, taken along line 3—3;

FIGS. 4A and 4B are cross section, diagrammatical views of the retaining and locking clamp of FIG. 1 illustrated in "open" and "closed" positions, with portions broken away to line 4—4 in FIG. 3 in the direction of the arrows; and FIG. 5 is an enlarged, cross section view of the inner rod of the retaining and locking clamp of an alternative embodiment.

THE BEST MODE FOR CARRYING OUT THE INVENTION

Referring to FIG. 1, there is shown a retaining and locking clamp of the present invention, designated 12. Clamp 12 is mounted onto an end plate 14 of an apparatus 16. Apparatus 16 in the preferred embodiment is a millimeter wave analyzer. Analyzer 16 includes a millimeter waveguide 17 which in turn includes a waveguide plate 18. Waveguide plate 18, which is visible in FIG. 1, includes an aperture 19. Aperture 19 is adapted to transmit electromagnetic energy to a conventional waveguide 20. Waveguide 20 includes at least one waveguide plate 22 which is adapted to be positioned contiguous with millimeter waveguide plate 18 such that the electromagnetic energy propagating through millimeter waveguide 17 would exit aperture 19 of millimeter waveguide plate 18 and enter an aperature of waveguide 20, not shown. Although millimeter waveguide 17 includes aperture 19 in the preferred embodiment, it is within the knowledge of one skilled in the art to provide aperture 19 as an element of end plate 14.

End plate 14 also includes a second retaining and locking clamp 112. Since clamp 112 is identical to clamp 12, elements of clamp 112 which are identical to their counterparts of clamp 12 are designated by the addition of a numeral "1" to the designation of the identical counterpart in clamp 12. Therefore, clamp 112 will not be hereinafter described in detail unless appropriate.

More particularly, as best shown in FIGS. 2A, 2B and 3, clamp 12 comprises an inner, generally cylindrical rod 24 that is mounted onto end plate 14, a tubular outer sleeve 26 that is positioned over inner rod 24, and a turn knob 28 that is mounted onto inner rod 24. Outer sleeve 26 includes a radially and outwardly extending retaining flange 30.

Inner rod 24 includes a first outer end portion 32 and a second inner end portion 34. Second end portion 34 is secured to end plate 14 and held against rotation in an appropriate manner such as securance by screws or bolts. As best shown in FIGS. 2A and 2B, second end portion 34 includes a squared portion 35 which is positioned within a squared aperture 36 in end plate 14. The cooperative action of squared portion 35 and squared aperture 36 permits the correct orientation of clamp 12. In addition, second end portion 34 includes a threaded portion 37 that extends beyond squared portion 35. Threaded portion 37 includes a plurality of external screw threads. A conventional nut 38 is threaded onto second end threaded portion 37 so as to retain inner rod 24 onto end plate 14. Further, a conventional lock washer 40 may be positioned between end plate 14 and nut 38.

First outer end portion 32 of inner rod 24 includes a cross-cut recess or cylindrical segment recess 42. The creation of cylindrical segment recess 42 leaves a flange 44 on the first end portion 32. Inner rod 24 further includes an axially-extending groove 46 that extends from squared portion 35 to cylindrical segment recess 42. The surface of cylindrical segment recess 42 that is in communication with axial groove 46 is designated as surface 43.

Outer sleeve 26 has internal bores 48 and 49 which are of different diameters, with bore or counterbore 49 having the greater diameter. In addition, bore 48 includes a radially and inwardly extending detent 50. Further, a cylindrical, outwardly extending groove 51 is provided. Groove 51, which has an arcuate cross section at the outer end of bore 48, is adapted to receive an O-ring 54. Counterbore 49 is adapted to receive a coil spring 56.

As for axially-extending groove 46, it enables the assembly of inner rod 24 within outer sleeve 26 by allowing the entry and then the axial movement of inner rod 24 within outer sleeve 26 until detent 50 has been received within groove 46. During operation of the invention, detect 50 remains within the recess 42 and does not engage groove 46.

Moreover, turn knob 28 includes a threaded axial projection 58 which is adapted to be received within a threaded channel 59 of first outer end portion 32 of inner rod 24 such that as turn knob 28 is rotated clockwise, projection 58 would screw into channel 59 and inner surface 60 of turn knob 28 would engage O-ring 54. The continued rotation causes outer sleeve 26 and retaining flange 30 to rotate from a first or free position to a second or retained position. Further rotation causes retaining flange 30 to move in an axial direction toward end plate 14. The axial movement is terminated when retaining flange 30 is at a third or locked position.

In assembly, with groove 46 of inner rod 24 aligned with detent 50 of outer sleeve 26, inner rod 24 is axially inserted into outer sleeve 26 until detent 50 is located within cylindrical segment recess 42. In the preferred embodiment, detent 50 has a radial height of approximately 0.040 inch, a circumferential base width of approximately 0.060 inch, and an axial length of approximately 0.080 inch. As for axial groove 46, it has a radial depth of approximately 0.040 inch. Further, cylindrical segment recess 42 has a radial depth of approximately 0.080 inch and an axial length of approximately 0.180 inch. The axial length of cylindrical segment recess 42 is that distance from flange 44 of inner rod 24 to surface 43 of recess 42.

Due to the presence of detent 50, inner rod 24 can slide through outer sleeve 26 only when detent 50 and axial groove 46 are properly aligned in their cooperative positions. When detent 50 is located within cylindrical segment recess 42, relative rotational movement of outer sleeve 26 and inner rod 24 is limited between a first or free position in which detent 50 is at one end of cylindrical segment recess 42, as shown in FIG. 4A, and a second or retained position in which detent 50 is at the other end of cylindrical segment recess 42, as shown in FIG. 4B. The degree of relative rotation of outer sleeve 26 is determined by the radial depth of recess 42 and the circumferential width of detent 50. In the preferred embodiment, the relative rotational movement of outer sleeve 26 and inner rod 24 is 90°, as shown in FIGS. 4A and 4B. Once retaining flange 30 is in its retained position of FIG. 4B, further rotation of turn knob 28 would translate outer sleeve 26 toward end plate 14. The amount of this translational movement is determined by the difference between the axial lengths of recess 42 and detent 50.

Spring 56 is then placed within counterbore 49 of outer sleeve 26 such that spring 56 winds about second end portion 34 of inner rod 24. Second end threaded portion 37 of inner rod 24 is then placed through squared aperture 36 of end plate 14. Squared portion 35 is fitted within squared aperture 36 such that clamp 12 is in the correct orientation, that is, cylindrical segment recess 42 is positioned to permit retaining flange 30 to rotate from the open position shown in FIG. 4A to the retained position shown in FIG. 4B. Washer 40 is then positioned about threaded end 37. Nut 38 is then threaded onto threaded end 37 so as to securely fasten inner rod 24 onto end plate 14. In turn, outer sleeve 26 is also secured onto end plate 14 in that flange 44 at first end portion 32 of inner rod 24 engages detent 50 so as to prevent the removal of outer sleeve 26 from inner rod 24.

O-ring 54 is placed within cylindrical groove 51 of outer sleeve 26. Threaded projection 58 of turn knob 28 is threaded into channel 59 of first end portion 32 of inner rod 24.

In operation, retaining flange 30 is positioned at a first or open position, which is either the up position of clamp 12 or the down position of clamp 112, as best shown in FIGS. 1 and 4A. As the user rotates turn knob 28 in a clockwise direction, first surface 60 of turn knob 28 frictionally engages O-ring 54. Since O-ring 54, in turn, is in frictional engagement with groove 51 of outer sleeve 26, the user's continued clockwise rotation of turn knob 28 also rotates outer sleeve 26 such that retaining flange 30 moves to its retaining position, as best shown in FIG. 4B. The degree of rotation of retaining flange 30 is determined by the radial depth of recess 42 and the circumferential width of detent 50.

In a similar fashion, the user's clockwise rotation of turn knob 128 for clamp 112 rotates retaining flange 130 of clamp 112 from its first position, as shown in FIG. 1 to its retaining position, not shown. Although clamp 112 is not illustrated in detail to eliminate needless duplication, the retaining position of retaining flange 130 would be approximately 90° from its first position, which is the position illustrated in FIG. 1. The retaining position of retaining flange 130 would be similar to that illustrated in FIG. 4B for retaining flange 30, but 180° in the opposite direction. In essence, when retaining flanges 30 and 130 are in their retaining positions, they point toward each other. With both retaining flanges at their retaining positions, plate 22 of waveguide 20 is securely retained between the retaining flanges and plate 18 of millimeter waveguide 17.

As the user continues to rotate turn knob 28, turn knob 28 pushes or translates outer sleeve 26 towards end plate 14, as shown diagrammatically by the arrows in FIG. 3. This force is countered by the spring force of spring 56. The user terminates his rotation of turn knob 28 when retaining flange 30 has snugly clamped waveguide plate 22 between itself and end plate 18. The clamped position is designated as the third or locked position. The amount of the translational movement is determined by the difference between the axial lengths of recess 42 and detent 50. The user then rotates turn knob 128 of clamp 112 such that retaining flange 130 would similarly clamp waveguide plate 22 to end plate 18. Waveguide 20 is now securely attached to analyzer 16.

Thus, the user needs only use one hand to perform the dual, continuing action of retention, i.e., the 90° swing of retaining flange 30, and clamping, i.e., the tightening of turn knob 28. The user's other hand, during this procedure, is supporting an apparatus such as waveguide 20. The user in the prior art, however, would probably first position and secure waveguide 20 to a working surface, then use both hands to position a retaining device that may be analogous to retaining flange 30, and finally tighten a securing device that may be analogous to turn knob 28.

In demounting waveguide 20 from analyzer 16, the user would reverse the procedure. The initial turns of turn knob 28 would loosen or translate turn knob 28 from inner rod 24, and the remaining rotation would rotate retaining flange 30 by 90°. The reverse procedure still retains the attributes of utilizing a continuing counterclockwise motion to loosen turn knob 28 and rotate flange 30. In addition, the user is capable of performing the demounting procedure with one hand, permitting the other hand to support waveguide 20.

The amount of rotation of retaining flange 30, for example, is approximately 90° in the preferred embodiment, as shown in FIGS. 4A and 4B. This amount of rotation is dictated by the radial depth of recess 42 and the circumferential width of detent 50. As best shown in FIG. 4A, detent 50 is in contact with one end of cylindrical segment recess 42. As outer sleeve 26, and in turn retaining flange 30, rotates to the second position in FIG. 4B, detent 50 now engages the other end of cylindrical segment recess 42. If the depth of cylindrical segment recess 42 is less or shallower than that illustrated in FIGS. 4A and 4B, the angle rotation of outer sleeve 26 will be less than the approximately 90° rotation of the preferred embodiment. Conversely, if the depth of cylindrical segment recess 42 is greater than that shown in the preferred embodiment, the angle of rotation of outer sleeve 26 would be greater, for example, 120°. As best shown in the alternative embodiment of FIG. 5, cylindrical segment recess 42 need not be a straight cut of the preferred embodiment, but rather a "V" shaped cut.

In an alternative embodiment, not shown, O-ring 54 and groove 51 are eliminated. The rotation of outer sleeve 26 in the alternative embodiment depends on the frictional engagement of inner surface 60 of turn knob 28 with surface 62 of outer sleeve 26.

It will be apparent to those skilled in the art that various modifications may be made within the spirit of the invention and the scope of the appended claims. For example, recess 42 may be positioned within bore 48 of outer sleeve 26 and detent 50 on inner rod 24.

We claim:

1. A retaining and locking clamp, mounted onto a first apparatus, for retaining and locking a second apparatus to said first apparatus, said first apparatus has a plate which in turn includes an aperture, comprising:
   an inner rod having a first end portion and a second end portion, said second end portion being adapted to be received within the aperture of said first apparatus plate so as to mount said inner rod to said first apparatus;
   an outer sleeve that is rotatbly mounted onto said inner rod, said outer sleeve has a retaining and locking flange and a surface;
   said inner rod and said outer sleeve including cooperating means for providing limited rotational and translational relative movements between said inner rod and said outer sleeve; and a turn knob that is rotatably mounted onto said inner rod, said turn knob has a surface that is adapted to frictionally engage said outer sleeve surface, whereby rotating said turn knob causes said turn knob surface to frictionally engage said outer sleeve surface so as to permit said outer sleeve flange to retain said second apparatus.

2. The retaining and locking claim as claimed in claim 1, wherein rotating said turn knob after the rotation of said outer sleeve flange causes said flange to firmly lock said second apparatus to said first apparatus.

3. The retaining and locking clamp as claimed in claim 1, wherein said cooperating means includes a cylindrical segment recess on said inner rod; and a radially and inwardly directed detent on said outer sleeve.

4. The retaining and locking clamp as claimed in claim 3, wherein the degree of rotation of said outer sleeve is approximately 90°.

5. The retaining and locking clamp as claimed in claim 4, further comprises a frictional device that is interposed between said outer sleeve surface and said turn knob surface so as to frictionally engage both of said surfaces.

6. The retaining and locking clamp as claimed in claim 5, wherein said frictional device is an O-ring.

7. A retaining and locking clamp, mounted onto an electrical apparatus, for retaining and locking a waveguide to said apparatus, said apparatus has a plate which in turn inclues an aperture, comprising:

an inner rod having a first end portion and a second end portion, said second end portion being adapted to be received within the aperture of said apparatus plate so as to mount said inner rod to said apparatus;

an outer sleeve that is rotatably mounted onto said inner rod, said outer sleeve has a retaining and locking flange and a surface;

said inner rod and said outer sleeve including cooperating means for providing limited rotational and translational relative movements between said inner rod and said outer sleeve; and a turn knob that is rotatably mounted onto said inner rod, said turn knob has a surface that is adapted to frictionally engage said outer sleeve surface, whereby rotating said turn knob causes said turn knob surface to frictionally engage said outer sleeve surface so as to permit said outer sleeve flange to retain said waveguide.

8. The retaining and locking clamp as claimed in claim 7, wherein rotating said turn knob after the rotation of said outer sleeve flange causes said flange to firmly lock said waveguide to said apparatus.

9. The retaining and locking clamp as claimed in claim 7, wherein said cooperating means includes a cylindrical segment recess on said inner rod; and a radially and inwardly directed detent on said outer sleeve.

10. The retaining and locking clamp as claimed in claim 9, wherein the degree of rotation of said outer sleeve is approximately 90°.

11. The retaining and locking clamp as claimed in claim 10, further comprises a frictional device that is interposed between said outer sleeve surface and said turn knob surface so as to frictionally engage both of said surfaces.

12. The retaining and locking clamp as claimed in claim 11, wherein said frictional device is an O-ring.

13. A retaining and locking clamp, mounted onto a first apparatus, for retaining and locking a second apparatus to said first apparatus, said first apparatus has a plate which in turn includes an aperture, comprising:

an inner rod having a first end portion and a second end portion, said second end portion being adapted to be received within the aperture of said first apparatus plate so as to mount said inner rod to said first apparatus, wherein said inner rod includes an axially-extending groove and a cylindrical segment recess, said recess having a predetermined radial depth and a predetermined axial length;

an outer, tubular sleeve that is rotatably mounted onto said inner rod, said outer sleeve has a surface, an outwardly and radially extending retaining and locking flange, and an inwardly and radially extending detent that is adapted to be cooperatively received by said inner rod groove during the mounting of said outer sleeve to said inner rod, said detent has a predetermined circumferential width and a predetermined axial length; and a turn knob that is rotatably mounted onto said inner rod adjacent to said inner rod first end portion, said turn knob has a surface that is adapted to frictionally engage said outer sleeve surface, whereby rotating said turn knob causes said turn knob surface to frictionally engage said outer sleeve surface so as to permit said outer sleeve flange to retain said second apparatus, the degree of relative rotation of said inner rod and said outer sleeve is determined by the radial depth of said recess and the circumferential width of said detent.

14. The retaining and locking clamp as claimed in claim 13, wherein rotating said turn knob after the rotation of said outer sleeve flange causes said flange to translate in an axial direction so as to firmly lock said second apparatus to said first apparatus, the amount of relative translation is determined by the difference between the axial lengths of said recess and said detent.

15. The retaining and locking clamp as claimed in claim 13 or 14, wherein the degree of rotation of said outer sleeve is approximately 90°.

16. The retaining and locking clamp as claimed in claim 15, further comprising a frictional device that is interposed between said outer sleeve surface and said turn knob surface so as to frictionally engage both of said surfaces.

17. The retaining and locking clamp as claimed in claim 16, wherein said frictional device is an O-ring.

18. The retaining and locking clamp as claimed in claim 17, wherein the aperture of said first apparatus plate has a rectangular configuration, wherein said inner rod second end portion has a rectangular portion that is adapted to be received within the rectangular aperture, whereby the cooperative action of said rectangular portion and said rectangular aperture permits said clamp to be positioned at a desired orientation.

19. A retaining and locking clamp, mounted onto a first apparatus, for retaining and locking a second apparatus to said first apparatus, said first apparatus has a plate which in turn includes an aperture and said second apparatus includes a mounting plate, wherein the aperture of said first apparatus plate has a rectangular configuration, comprising:

an inner rod having a first end portion and a second end portion, said second end portion being adapted to be received within the aperture of said first apparatus plate so as to mount said inner rod to said first apparatus, wherein said inner rod includes an axially-extending groove and a cylindrical segment recess, said recess having a predetermined radial depth and a predetermined axial length, and said inner rod second end portion has a rectangular portion that is adapted to be received within the rectangular aperture, whereby the cooperative action of said rectangular portion and said rectangular aperture permits said clamp to be positioned at a desired orientation;

an outer, tubular sleeve that is rotatably mounted onto said inner rod, said outer sleeve has a surface, an outwardly and radially extending retaining and locking flange, and an inwardly and radially extending detent that is adapted to be cooperatively received by said inner rod groove during the mounting of said outer sleeve to said inner rod, said detent has a predetermined circumferential width and a predetermined axial length; and a turn knob that is rotatably mounted onto said inner rod adjacent to said inner rod first end portion, said turn knob has a surface that is adapted to frictionally engage said outer sleeve surface, whereby rotating said turn knob causes said turn knob surface to frictionally engage said outer sleeve surface so as to permit said outer sleeve flange to engage the mounting plate of said second apparatus so as to retain said second apparatus, the degree of relative rotation of said inner rod and said outer sleeve is determined by the radial depth of said recess and the circumferential width of said detent.

20. The retaining and locking clamp as claimed in claim 19, wherein rotating said turn knob after the rotation of said outer sleeve flange causes said flange to translate in an axial direction so as to firmly lock the mounting plate of said second apparatus to said first apparatus, the amount of relative translation is determined by the difference between the axial lengths of said recess and said detent.

21. The retaining and locking clamp as claimed in claim 19 or 20, wherein the degree of rotation of said outer sleeve is approximately 90°.

22. The retaining and locking clamp as claimed in claim 21, further comprising a frictional device that is interposed between said outer sleeve surface and said turn knob surface so as to frictionally engage both of said surfaces.

23. The retaining and locking clamp as claimed in claim 22, wherein said frictional device is an O-ring.

24. The retaining and locking clamp as claimed in claim 23, wherein said first apparatus includes another of said clamps for retaining and locking said second apparatus.

* * * * *